US 11,942,862 B2

(12) United States Patent
Zhou

(10) Patent No.: US 11,942,862 B2
(45) Date of Patent: Mar. 26, 2024

(54) VOLTAGE GENERATION MODULE AND POWER SUPPLY MANAGEMENT CHIP

(71) Applicants: Beijing ESWIN Computing Technology Co., Ltd., Beijing (CN); Hefei ESWIN IC Technology Co., Ltd., Hefei (CN)

(72) Inventor: Yonghua Zhou, Beijing (CN)

(73) Assignees: Beijing ESWIN Computing Technology Co., Ltd., Beijing (CN); Hefei ESWIN IC Technology Co., Ltd., Hefei (CN)

( * ) Notice: Subject to any disclaimer, the term of this patent is extended or adjusted under 35 U.S.C. 154(b) by 314 days.

(21) Appl. No.: 17/612,289

(22) PCT Filed: May 31, 2021

(86) PCT No.: PCT/CN2021/097229
§ 371 (c)(1),
(2) Date: Nov. 18, 2021

(87) PCT Pub. No.: WO2022/110734
PCT Pub. Date: Jun. 2, 2022

(65) Prior Publication Data
US 2023/0253880 A1    Aug. 10, 2023

(30) Foreign Application Priority Data
Nov. 25, 2020   (CN) .......................... 202011340598.0

(51) Int. Cl.
*H02M 3/156*    (2006.01)
*H02M 1/36*    (2007.01)

(52) U.S. Cl.
CPC ............. *H02M 3/156* (2013.01); *H02M 1/36* (2013.01)

(58) Field of Classification Search
CPC ....... H02M 3/156; H02M 1/36; H02M 1/0006
See application file for complete search history.

(56) References Cited

U.S. PATENT DOCUMENTS 10,936,000 B1 *  3/2021  Hanschke ............... G05F 1/565
11,296,599 B1 *  4/2022  Golara ..................... G05F 1/46
(Continued)

FOREIGN PATENT DOCUMENTS

CN           1469216 A        1/2004
CN         102629148 A        8/2012
(Continued)

OTHER PUBLICATIONS

Written Opinion of the International Search Authority corresponding to International Application No. PCT/CN2021/097229, dated Jul. 7, 2021. (10 pages).

(Continued)

*Primary Examiner* — Kyle J Moody
(74) *Attorney, Agent, or Firm* — Maginot, Moore & Beck LLP

(57) ABSTRACT

A voltage generation module and a power supply management chip include a reference voltage generation circuit, a comparison circuit, a switch circuit and a voltage control circuit. The reference voltage generation circuit generates a first reference voltage and a second reference voltage. The comparison circuit applies a turn-on control signal or a turn-off control signal. In the case that the switch circuit controls the input terminal to be electrically disconnected from the voltage output terminal, the voltage control circuit controls an output voltage signal from the voltage output terminal in accordance with the first reference voltage.

17 Claims, 2 Drawing Sheets

(56) References Cited

U.S. PATENT DOCUMENTS

| | | | |
|---|---|---|---|
| 2004/0051509 A1 | 3/2004 | Matsuo et al. | |
| 2011/0050186 A1* | 3/2011 | Jinbo | G05F 1/565 |
| | | | 323/275 |
| 2012/0200343 A1 | 8/2012 | Hirobe et al. | |
| 2015/0381038 A1 | 12/2015 | Brown | |

FOREIGN PATENT DOCUMENTS

| | | |
|---|---|---|
| CN | 106716804 A | 5/2017 |
| CN | 112421952 A | 2/2021 |
| WO | 2012031241 A2 | 3/2012 |

OTHER PUBLICATIONS

Machine Translation of Written Opinion of the International Search Authority corresponding to International Application No. PCT/CN2021/097229, dated Jul. 7, 2021. (2 pages).

Machine Translation of CN112421952A. (31 Pages).

* cited by examiner

VOLTAGE GENERATION MODULE AND POWER SUPPLY MANAGEMENT CHIP

CROSS-REFERENCE TO RELATED APPLICATION

This application is the U.S. national phase of PCT Application No. PCT/CN2021/097229 filed on May 31, 2021, which claims priority to Chinese Patent Application No. 202011340598.0 filed on Nov. 25, 2020, the disclosures of which are incorporated in their entirety by reference herein.

TECHNICAL FIELD

The present disclosure relates to the field of voltage generation technologies, in particular to a voltage generation module and a power supply management chip.

BACKGROUND

In a power supply management chip having a wide input voltage range (2.5V~45V), it is necessary to generate an additional voltage VDD as a power supply for an internal core circuit. In the case that an input voltage is smaller than a set value of VDD, VDD follows the input voltage. In the case that the input voltage is larger than the set value of VDD, VDD stabilizes at a predetermined value. It is unable to generate VDD accurately without an additional mask layer or a bandgap reference module in a conventional voltage generation module for generating VDD.

SUMMARY

A main object of the present disclosure is to provide a voltage generation module and a power supply management chip, so as to solve a problem that it is unable to generate an output voltage signal accurately without an additional mask layer or a bandgap reference module in a conventional voltage generation module, that is, it is unable to enable the output voltage signal to be as the input voltage when an input voltage is smaller than a predetermined output voltage, and enable a voltage value of the output voltage signal to stabilize at a set voltage value when the input voltage is larger than the predetermined output voltage.

In order to achieve the above object, a voltage generation module is provided, including a reference voltage generation circuit, a comparison circuit, a switch circuit and a voltage control circuit. The reference voltage generation circuit is electrically connected to an input terminal, a first reference voltage terminal and a second reference voltage terminal, and configured to generate a first reference voltage and a second reference voltage in accordance with an input voltage from the input terminal, output the first reference voltage through the first reference voltage terminal, and output the second reference voltage through the second reference voltage terminal. The comparison circuit is electrically connected to the input terminal and the second reference voltage terminal, and configured to compare the second reference voltage with the input voltage, in the case that the input voltage is smaller than the second reference voltage, apply a turn-on control signal to a control terminal of the switch circuit, and in the case that the input voltage is larger than the second reference voltage, apply a turn-off control signal to the control terminal of the switch circuit. The control terminal of the switch circuit is electrically connected to the comparison circuit, a first terminal of the switch circuit is electrically connected to the input terminal, a second terminal of the switch circuit is electrically connected to a voltage output terminal, and the switch circuit is configured to, in the case that the turn-on control signal is applied to the control terminal of the switch circuit, control the input terminal to be electrically connected to the voltage output terminal, and in the case that the turn-off control signal is applied to the control terminal of the switch circuit, control the input terminal to be electrically disconnected from the voltage output terminal. The voltage control circuit is electrically connected to the first reference voltage terminal and the voltage output terminal, and configured to, in the case that the switch circuit controls the input terminal to be electrically disconnected from the voltage output terminal, control an output voltage signal from the voltage output terminal in accordance with the first reference voltage.

In a possible embodiment of the present disclosure, the reference voltage generation circuit includes a first generation branch circuit, a second generation branch circuit and a third generation branch circuit. The first generation branch circuit includes a first control terminal, the second generation branch circuit includes a second control terminal, the third generation branch circuit includes a third control terminal, and the first control terminal, the second control terminal and the third control terminal are electrically connected to each other. A first current flowing through the first generation branch circuit, a second current flowing through the second generation branch circuit, and a third current flowing through the third generation branch circuit are equal to each other. The first generation branch circuit is electrically connected to the input terminal, and configured to generate the first current in accordance with the input voltage. The second generation branch circuit is electrically connected to the first reference voltage terminal, and configured to generate the second current in accordance with the first reference voltage. The third generation branch circuit is electrically connected to the second reference voltage terminal, and configured to generate the third current in accordance with the second reference voltage.

In a possible embodiment of the present disclosure, the first generation branch circuit includes a first generation transistor, a second generation transistor, a first resistor, a second resistor, a first control transistor, a second control transistor and a third control transistor. A first electrode of the first control transistor is electrically connected to the input terminal, and both a control electrode of the first control transistor and a second electrode of the first control transistor are electrically connected to the first control terminal. A control electrode of the second control transistor is electrically connected to the first control terminal, a first electrode of the second control transistor is electrically connected to the input terminal, and a second electrode of the second control transistor is electrically connected to a first electrode of the first generation transistor. A control electrode of the third control transistor is electrically connected to a start control terminal and the first electrode of the first generation transistor, a first electrode of the third control transistor is electrically connected to the first control terminal, and a second electrode of the third control transistor is electrically connected to a control electrode of the first generation transistor and a first terminal of the first resistor. A second electrode of the first generation transistor is electrically connected to a second terminal of the first resistor and a first voltage terminal. A first terminal of the second resistor is electrically connected to the second electrode of the third control transistor, and a second terminal of the second resistor is electrically connected to a first electrode of the second generation transistor. A control electrode of the second generation transistor is electrically connected to the first electrode of the second generation transistor, and a second electrode of the second generation transistor is electrically connected to the second terminal of the first resistor. The first current is a sum of a current flowing through the first resistor and a current flowing through the second resistor.

In a possible embodiment of the present disclosure, the first generation transistor and the second generation transistor are each an NPN-type triode, the first control transistor and the second control transistor are each a P-type transistor, and the third control transistor is an N-type transistor.

In a possible embodiment of the present disclosure, the second generation branch circuit includes a fourth control transistor and a third resistor circuit. A control electrode of the fourth control transistor is electrically connected to the second control terminal, a first electrode of the fourth control transistor is electrically connected to the input terminal, and a second electrode of the fourth control transistor is electrically connected to a first voltage terminal through the third resistor circuit. The second current is a current flowing through the third resistor circuit.

In a possible embodiment of the present disclosure, the third resistor circuit includes at least two third resistors connected in series to each other, and the fourth control transistor is a P-type transistor.

In a possible embodiment of the present disclosure, the third generation branch circuit includes a fifth control transistor, a sixth control transistor, a seventh control transistor, an eighth control transistor and a fourth resistor. A control electrode of the fifth control transistor is electrically connected to the third control terminal, a first electrode of the fifth control transistor is electrically connected to the input terminal, and a second electrode of the fifth control transistor is electrically connected to a first terminal of the fourth resistor. A control electrode of the sixth control transistor is electrically connected to the third control terminal, a first electrode of the sixth control transistor is electrically connected to the input terminal, and a second electrode of the sixth control transistor is electrically connected to a first electrode of the eighth control transistor. A control electrode of the seventh control transistor is electrically connected to a control electrode of the eighth control transistor, a first electrode of the seventh control transistor is electrically connected to a second terminal of the fourth resistor, and a second electrode of the seventh control transistor is electrically connected to a second electrode of the eighth control transistor. The control electrode of the eighth control transistor is electrically connected to the first electrode of the eighth control transistor, and the second electrode of the eighth control transistor is electrically connected to a first voltage terminal. The first terminal of the fourth resistor is electrically connected to the second reference voltage terminal.

In a possible embodiment of the present disclosure, the fifth control transistor, the sixth control transistor, the seventh control transistor and the eighth control transistor are each a P-type transistor.

In a possible embodiment of the present disclosure, the comparison circuit includes a first comparison transistor, a second comparison transistor, a third comparison transistor and a fourth comparison transistor. A control electrode of the first comparison transistor is electrically connected to a control electrode of the second comparison transistor, a first electrode of the first comparison transistor is electrically connected to the input terminal, and a second electrode of the first comparison transistor is electrically connected to the control terminal of the switch circuit. The control electrode of the second comparison transistor is electrically connected to a second electrode of the second comparison transistor, a first electrode of the second comparison transistor is electrically connected to the input terminal, and the second electrode of the second comparison transistor is electrically connected to the first terminal of the fourth resistor. A control electrode of the third comparison transistor is electrically connected to a start control terminal, a first electrode of the third comparison transistor is electrically connected to the control terminal of the switch circuit, and a second electrode of the third comparison transistor is electrically connected to the first voltage terminal. A control electrode of the fourth comparison transistor is electrically connected to the control electrode of the third comparison transistor, a first electrode of the fourth comparison transistor is electrically connected to the second terminal of the fourth resistor, and a second electrode of the fourth comparison transistor is electrically connected to the first voltage terminal.

In a possible embodiment of the present disclosure, the first comparison transistor and the second comparison transistor are each a P-type transistor, and the third comparison transistor and the fourth comparison transistor are each an N-type transistor.

In a possible embodiment of the present disclosure, the switch circuit includes a switch transistor, a control electrode of the switch transistor is the control terminal of the switch circuit, a first electrode of the switch transistor is the first terminal of the switch circuit, and a second electrode of the switch transistor is the second terminal of the switch circuit.

In a possible embodiment of the present disclosure, the switch transistor is a P-type transistor.

In a possible embodiment of the present disclosure, the voltage control circuit includes a buffer, a voltage control transistor and a control capacitor. An input terminal of the buffer is electrically connected to the first reference voltage terminal, an output terminal of the buffer is electrically connected to a control electrode of the voltage control transistor, and the buffer is configured to apply the first reference voltage to the control electrode of the voltage control transistor. A first electrode of the voltage control transistor is electrically connected to the input terminal, and a second electrode of the voltage control transistor is electrically connected to the voltage output terminal. A first terminal of the control capacitor is electrically connected to the output terminal of the buffer, and a second terminal of the control capacitor is electrically connected to a first voltage terminal.

In a possible embodiment of the present disclosure, the voltage control transistor is an N-type transistor.

In a possible embodiment of the present disclosure, the voltage generation module further includes a ninth control transistor. The reference voltage generation circuit includes a second generation branch circuit, and the second generation branch circuit includes a fourth control transistor and a third resistor circuit. A second electrode of the fourth control transistor is electrically connected to the third resistor circuit through the ninth control transistor, a control electrode of the ninth control transistor is electrically connected to the input terminal of the buffer, a first electrode of the ninth control transistor is electrically connected to the second electrode of the fourth control transistor, and a second electrode of the ninth control transistor is electrically connected to the first voltage terminal through the third resistor circuit.

In a possible embodiment of the present disclosure, the ninth control transistor is an N-type transistor.

A power supply management chip is further provided, including the above-mentioned voltage generation module.

The reference voltage generation circuit, the comparison circuit, the switch circuit and the voltage control circuit are provided in the voltage generation module and the power supply management chip according to the embodiment of the present disclosure, so as to generate the output voltage signal in accordance with the input voltage. In the case that the input voltage is smaller than a predetermined output voltage, the output voltage signal is the input voltage, and in the case that the input voltage is larger than the predetermined output voltage, a voltage value of the output voltage signal stabilizes at a set voltage value. A structure of the voltage generation module is not complicated, and it is unnecessary to provide an additional mask layer or a bandgap reference module in the voltage generation module.

DETAILED DESCRIPTION

Figure 1:
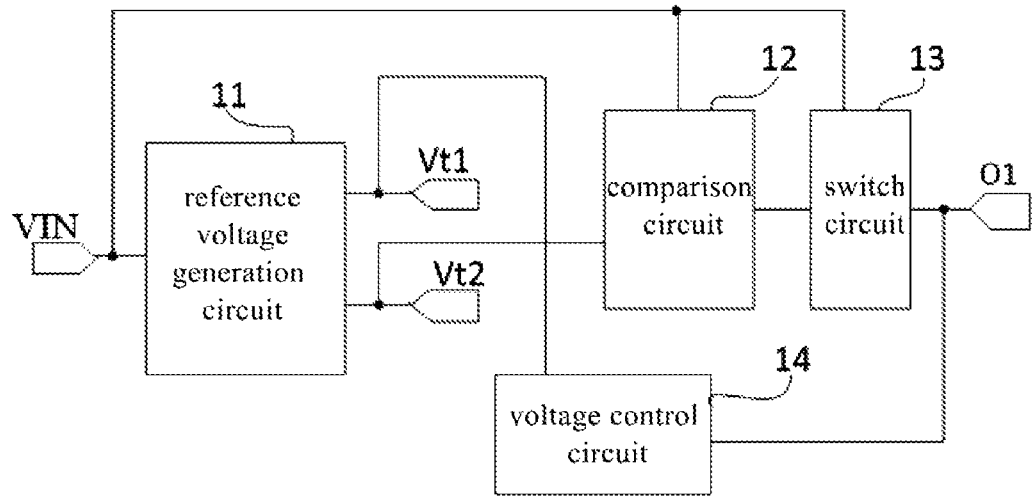
FIG. 1 is a structural diagram of a voltage generation module according to one embodiment of the present disclosure.

The technical solutions in the embodiments of the present disclosure will be described hereinafter clearly and completely with reference to the drawings of the embodiments of the present disclosure. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, each transistor maybe a triode, a thin film transistor (TFT), a field effect transistor (FET), or any other element having a same characteristic. In order to differentiate between two electrodes of the transistor other than a control electrode, one of them may be called as a first electrode, and the other may be called as a second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a source electrode and the second electrode may be a drain electrode, or the control electrode may be a gate electrode, the first electrode may be a drain electrode and the second electrode may be a source electrode.

A voltage generation module according to the embodiment of the present disclosure includes a reference voltage generation circuit 11, a comparison circuit 12, a switch circuit 13 and a voltage control circuit 14. The reference voltage generation circuit 11 is electrically connected to an input terminal, a first reference voltage terminal Vt1 and a second reference voltage terminal Vt2, and configured to generate a first reference voltage Vreg and a second reference voltage Vldo in accordance with an input voltage VIN from the input terminal, output the first reference voltage Vreg through the first reference voltage terminal Vt1, and output the second reference voltage Vldo through the second reference voltage terminal Vt2. The comparison circuit 12 is electrically connected to the input terminal and the second reference voltage terminal Vt2, and configured to compare the second reference voltage Vldo with the input voltage VIN, in the case that the input voltage VIN is smaller than the second reference voltage Vldo, apply a turn-on control signal to a control terminal of the switch circuit 13, and in the case that the input voltage VIN is larger than the second reference voltage Vldo, apply a turn-off control signal to the control terminal of the switch circuit 13. The control terminal of the switch circuit 13 is electrically connected to the comparison circuit 12, a first terminal of the switch circuit 13 is electrically connected to the input terminal, a second terminal of the switch circuit 13 is electrically connected to a voltage output terminal O1, and the switch circuit 13 is configured to, in the case that the turn-on control signal is applied to the control terminal of the switch circuit, control the input terminal to be electrically connected to the voltage output terminal O1, and in the case that the turn-off control signal is applied to the control terminal of the switch circuit, control the input terminal to be electrically disconnected from the voltage output terminal O1. The voltage control circuit 14 is electrically connected to the first reference voltage terminal Vt1 and the voltage output terminal O1, and configured to, in the case that the switch circuit controls the input terminal to be electrically disconnected from the voltage output terminal O1, control an output voltage signal at the voltage output terminal O1 in accordance with the first reference voltage Vreg.

The reference voltage generation circuit 11, the comparison circuit 12, the switch circuit 13 and the voltage control circuit 14 are provided in the voltage generation module according to the embodiment of the present disclosure, so as to generate the output voltage signal in accordance with the input voltage VIN. In the case that the input voltage VIN is smaller than a predetermined output voltage, the output voltage signal is the input voltage VIN, and in the case that the input voltage VIN is larger than the predetermined output voltage, a voltage value of the output voltage signal stabilizes at a set voltage value. A structure of the voltage generation module is not complicated, and it is unnecessary to provide an additional mask layer or a bandgap reference module in the voltage generation module. Further, the generated output voltage signal is independent of temperature, and follows the input voltage in a better manner in the case that the input voltage is small (for example, smaller than 3V), thereby to meet requirements on low-voltage operation.

In a specific implementation, the reference voltage generation circuit may include a first generation branch circuit, a second generation branch circuit and a third generation branch circuit. The first generation branch circuit includes a first control terminal, the second generation branch circuit includes a second control terminal, the third generation branch circuit includes a third control terminal, and the first control terminal, the second control terminal and the third control terminal are electrically connected to each other. A first current flowing through the first generation branch circuit, a second current flowing through the second generation branch circuit and a third current flowing through the third generation branch circuit are equal to each other. The first generation branch circuit is electrically connected to the input terminal, and configured to generate the first current in accordance with the input voltage. The second generation branch circuit is electrically connected to the first reference voltage terminal, and configured to generate the second current in accordance with the first reference voltage. The third generation branch circuit is electrically connected to the second reference voltage terminal, and configured to generate the third current in accordance with the second reference voltage.

In the embodiment of the present disclosure, the reference voltage generation circuit may include the first generation branch circuit, the second generation branch circuit and the third generation branch circuit, the first generation branch circuit generates the first current in accordance with the input voltage, the second generation branch circuit generates the second current in accordance with the first reference voltage, the third generation branch circuit generates the third current in accordance with the second reference voltage, and the first control terminal, the second control terminal and the third control terminal are electrically connected to each other, so as to enable the first current flowing through the first generation branch circuit, the second current flowing through the second generation branch circuit and the third current flowing through the third generation branch circuit to be equal to each other, thereby to acquire the first reference voltage independent of temperature and the second reference voltage independent of temperature.

In a possible embodiment of the present disclosure, the first generation branch circuit includes a first generation transistor, a second generation transistor, a first resistor, a second resistor, a first control transistor, a second control transistor and a third control transistor. A first electrode of the first control transistor is electrically connected to the input terminal, and both a control electrode of the first control transistor and a second electrode of the first control transistor are electrically connected to the first control terminal. A control electrode of the second control transistor is electrically connected to the first control terminal, a first electrode of the second control transistor is electrically connected to the input terminal, and a second electrode of the second control transistor is electrically connected to a first electrode of the first generation transistor. A control electrode of the third control transistor is electrically connected to a start control terminal and the first electrode of the first generation transistor, a first electrode of the third control transistor is electrically connected to the first control terminal, and a second electrode of the third control transistor is electrically connected to a control electrode of the first generation transistor and a first terminal of the first resistor. A second electrode of the first generation transistor is electrically connected to a second terminal of the first resistor and a first voltage terminal. A first terminal of the second resistor is electrically connected to the second electrode of the third control transistor, and a second terminal of the second resistor is electrically connected to a first electrode of the second generation transistor. A control electrode of the second generation transistor is electrically connected to the first electrode of the second generation transistor, and a second electrode of the second generation transistor is electrically connected to the second terminal of the first resistor. The first current is a sum of a current flowing through the first resistor and a current flowing through the second resistor.

In a specific implementation, the start control terminal may be electrically connected to a start control circuit, and the start control circuit may be configured to output a start control current signal during voltage generation.

In a possible embodiment of the present disclosure, the first voltage terminal may be, but not limited to, a ground terminal or a low voltage terminal.

In the embodiment of the present disclosure, the first generation transistor and the second generation transistor are each, but not limited to, an NPN-type triode, the first control transistor and the second control transistor are each, but not limited to, a P-type transistor, and the third control transistor is, but not limited to, an N-type transistor.

In a possible embodiment of the present disclosure, the second generation branch circuit includes a fourth control transistor and a third resistor circuit. A control electrode of the fourth control transistor is electrically connected to the second control terminal, a first electrode of the fourth control transistor is electrically connected to the input terminal, and a second electrode of the fourth control transistor is electrically connected to a first voltage terminal through the third resistor circuit. The second current is a current flowing through the third resistor circuit.

In a specific implementation, the third resistor circuit may include, but not limited to, at least two third resistors connected in series to each other, and the fourth control transistor may be, but not limited to, a P-type transistor.

In a possible embodiment of the present disclosure, the third generation branch circuit includes a fifth control transistor, a sixth control transistor, a seventh control transistor, an eighth control transistor and a fourth resistor. A control electrode of the fifth control transistor is electrically connected to the third control terminal, a first electrode of the fifth control transistor is electrically connected to the input terminal, and a second electrode of the fifth control transistor is electrically connected to a first terminal of the fourth resistor. A control electrode of the sixth control transistor is electrically connected to the third control terminal, a first electrode of the sixth control transistor is electrically connected to the input terminal, and a second electrode of the sixth control transistor is electrically connected to a first electrode of the eighth control transistor. A control electrode of the seventh control transistor is electrically connected to a control electrode of the eighth control transistor, a first electrode of the seventh control transistor is electrically connected to a second terminal of the fourth resistor, and a second electrode of the seventh control transistor is electrically connected to a second electrode of the eighth control transistor. The control electrode of the eighth control transistor is electrically connected to the first electrode of the eighth control transistor, and the second electrode of the eighth control transistor is electrically connected to a first voltage terminal. The first terminal of the fourth resistor is electrically connected to the second reference voltage terminal.

In the embodiment of the present disclosure, the fifth control transistor, the sixth control transistor, the seventh control transistor and the eighth control transistor are each, but not limited to, a P-type transistor.

In a possible embodiment of the present disclosure, the comparison circuit includes a first comparison transistor, a second comparison transistor, a third comparison transistor and a fourth comparison transistor. A control electrode of the first comparison transistor is electrically connected to a control electrode of the second comparison transistor, a first electrode of the first comparison transistor is electrically connected to the input terminal, and a second electrode of the first comparison transistor is electrically connected to the control terminal of the switch circuit. The control electrode of the second comparison transistor is electrically connected to a second electrode of the second comparison transistor, a first electrode of the second comparison transistor is electrically connected to the input terminal, and the second electrode of the second comparison transistor is electrically connected to the first terminal of the fourth resistor. A control electrode of the third comparison transistor is electrically connected to a start control terminal, a first electrode of the third comparison transistor is electrically connected to the control terminal of the switch circuit, and a second electrode of the third comparison transistor is electrically connected to the first voltage terminal. A control electrode of the fourth comparison transistor is electrically connected to the control electrode of the third comparison transistor, a first electrode of the fourth comparison transistor is electrically connected to the second terminal of the fourth resistor, and a second electrode of the fourth comparison transistor is electrically connected to the first voltage terminal.

In the embodiment of the present disclosure, the first comparison transistor and the second comparison transistor are each, but not limited to, a P-type transistor, and the third comparison transistor and the fourth comparison transistor are each, but not limited to, an N-type transistor In a possible embodiment of the present disclosure, the switch circuit includes a switch transistor, a control electrode of the switch transistor is the control terminal of the switch circuit, a first electrode of the switch transistor is the first terminal of the switch circuit, and a second electrode of the switch transistor is the second terminal of the switch circuit.

In the embodiment of the present disclosure, the switch transistor may be, but not limited to, a P-type transistor.

In a possible embodiment of the present disclosure, the voltage control circuit includes a buffer, a voltage control transistor and a control capacitor. An input terminal of the buffer is electrically connected to the first reference voltage terminal, an output terminal of the buffer is electrically connected to a control electrode of the voltage control transistor, and the buffer is configured to apply the first reference voltage to the control electrode of the voltage control transistor. A first electrode of the voltage control transistor is electrically connected to the input terminal, and a second electrode of the voltage control transistor is electrically connected to the voltage output terminal. A first terminal of the control capacitor is electrically connected to the output terminal of the buffer, and a second terminal of the control capacitor is electrically connected to a first voltage terminal In a specific implementation, the buffer may improve the driving capability at the output terminal of the buffer.

In the embodiment of the present disclosure, the voltage control transistor is, but not limited to, an N-type transistor.

Figure 2:
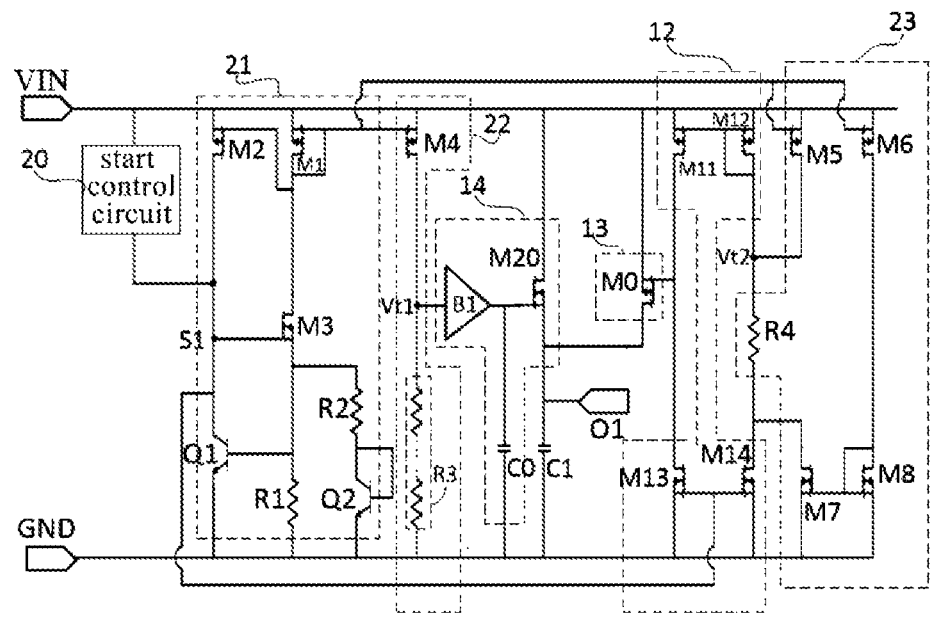
FIG. 2 is a circuit diagram of the voltage generation module according to one embodiment of the present disclosure.

As shown in FIG. 2, on the basis of the voltage generation module in FIG. 1, the voltage generation module further includes a start control circuit 20, the reference voltage generation circuit may include a first generation branch circuit 21, a second generation branch circuit 22 and a third generation branch circuit 23.

The first generation branch circuit 21 includes a first generation transistor Q1, a second generation transistor Q2, a first resistor R1, a second resistor R2, a first control transistor M1, a second control transistor M2 and a third control transistor M3.

A source electrode of the first control transistor M1 is electrically connected to the input terminal, and both a gate electrode of the first control transistor M1 and a drain electrode of the first control transistor M1 are electrically connected to the first control terminal. The input terminal is configured to apply the input voltage VIN. The first control terminal, the second control terminal and the third control terminal are electrically connected to each other.

A gate electrode of the second control transistor M2 is electrically connected to the first control terminal, a source electrode of the second control transistor M2 is electrically connected to the input terminal, and a drain electrode of the second control transistor M2 is electrically connected to a collector of the first generation transistor Q1.

A gate electrode of the third control transistor M3 is electrically connected to the start control terminal S1 and the collector of the first generation transistor Q1, a drain electrode of the third control transistor M3 is electrically connected to the first control terminal, and a source electrode of the third control transistor M3 is electrically connected to a base of the first generation transistor Q1 and a first terminal of the first resistor R1.

An emitter of the first generation transistor Q2 is electrically connected to a second terminal of the first resistor R1 and a ground terminal GND.

A first terminal of the second resistor R2 is electrically connected to the drain electrode of the third control transistor M3, and a second terminal of the second resistor R2 is electrically connected to a collector of the second generation transistor Q2.

A base of the second generation transistor Q2 is electrically connected to the collector of the second generation transistor Q2, and an emitter of the second generation transistor Q2 is electrically connected to the second terminal of the first resistor R1.

The second generation branch circuit 22 includes a fourth control transistor M4 and a third resistance circuit R3, a gate electrode of the fourth control transistor M4 is electrically connected to the second control terminal, a source electrode of the fourth control transistor M4 is electrically connected to the input terminal, and a drain electrode of the fourth control transistor M4 is electrically connected to the ground terminal GND through the third resistor circuit R3.

The third generation branch circuit 23 includes a fifth control transistor M5, a sixth control transistor M6, a seventh control transistor M7, an eighth control transistor M8 and a fourth resistor R4. A gate electrode of the fifth control transistor M5 is electrically connected to the third control terminal, a source electrode of the fifth control transistor M5 is electrically connected to the input terminal, and a drain electrode of the fifth control transistor M5 is electrically connected to a first terminal of the fourth resistor R4. A gate electrode of the sixth control transistor M6 is electrically connected to the third control terminal, a source electrode of the sixth control transistor M6 is electrically connected to the input terminal, and a drain electrode of the sixth control transistor M6 is electrically connected to a source electrode of the eighth control transistor M8. A gate electrode of the seventh control transistor M7 is electrically connected to a gate electrode of the eighth control transistor M8, a drain electrode of the seventh control transistor M7 is electrically connected to a second terminal of the fourth resistor R4, and a source electrode of the seventh control transistor M7 is electrically connected to a drain electrode of the eighth control transistor M8. The gate electrode of the eighth control transistor M8 is electrically connected to the drain electrode of the eighth control transistor M8, and the source electrode of the eighth control transistor M8 is electrically connected to the ground GND. The first terminal of the fourth resistor R4 is electrically connected to the second reference voltage terminal Vt2.

The comparison circuit 12 includes a first comparison transistor M11, a second comparison transistor M12, a third comparison transistor M13 and a fourth comparison transistor M14. A gate electrode of the first comparison transistor M11 is electrically connected to a gate electrode of the second comparison transistor M12, a source electrode of the first comparison transistor M11 is electrically connected to the input terminal, and a drain electrode of the first comparison transistor M11 is electrically connected to a gate electrode of a switch transistor M0. The gate electrode of the second comparison transistor M12 is electrically connected to a drain electrode of the second comparison transistor M12, a source electrode of the second comparison transistor M12 is electrically connected to the input terminal, and the drain electrode of the second comparison transistor M12 is electrically connected to the first terminal of the fourth resistor R1. A gate electrode of the third comparison transistor M13 is electrically connected to the start control circuit 20, a drain electrode of the third comparison transistor M13 is electrically connected to the gate electrode of the switch transistor M0, and a source electrode of the third comparison transistor M13 is electrically connected to the ground terminal GND. The start control circuit 20 is configured to output the start control current during voltage generation, so as to enable M1, M2, M3, and Q1 to operate normally. A gate electrode of the fourth comparison transistor M14 is electrically connected to the gate electrode of the third comparison transistor M13, a drain electrode of the fourth comparison transistor M14 is electrically connected to the second terminal of the fourth resistor R4, and a source electrode of the fourth comparison transistor M14 is electrically connected to the ground terminal GND.

The switch circuit 13 includes the switch transistor M0, a gate electrode of the switch transistor M0 is the control terminal of the switch circuit 13, a source electrode of the switch transistor M0 is the first terminal of the switch circuit 13, and a drain electrode of the switch transistor M0 is the second terminal of the switch circuit 13.

The source electrode of the switch transistor M0 is electrically connected to the input terminal, and the drain electrode of the switch transistor M0 is electrically connected to the voltage output terminal O1.

The voltage control circuit 14 includes a buffer B1, a voltage control transistor M20 and a control capacitor C0. An input terminal of the buffer B1 is electrically connected to the first reference voltage terminal Vt1, an output terminal of the buffer B1 is electrically connected to a gate electrode of the voltage control transistor M20, and the buffer B1 is configured to apply the first reference voltage Vreg to the gate electrode of the voltage control transistor M20, so as to improve driving capability at the gate electrode of M20 (In the embodiment of the present disclosure, because a size of M20 is relatively large, it is necessary to improve the driving capability of the gate electrode of M20). A drain electrode of the voltage control transistor M20 is electrically connected to the input terminal, and a source electrode of the voltage control transistor M20 is electrically connected to the voltage output terminal O1. A first terminal of the control capacitor C0 is electrically connected to the output terminal of the buffer B1, and the second terminal of the control capacitor C0 is electrically connected to the ground terminal GND.

In the embodiment shown in FIG. 2, C1 denotes a first capacitor, a first terminal of C1 is electrically connected to the voltage output terminal O1, and a second terminal of C1 is electrically connected to the ground terminal GND.

In the embodiment shown in FIG. 2, Q1 and Q2 are each, but not limited to, an NPN triode, M1 and M2 are each, but not limited to, a P-type metal-oxide-semiconductor (PMOS) transistor, M3 is, but not limited to, an N-type metal-oxide-semiconductor (NMOS) transistor, M4 is, but not limited to, a PMOS transistor, M5 and M6 are each, but not limited to, a PMOS transistor, M7 and M8 are each, but not limited to, an NMOS transistor, M11 and M12 are each, but not limited to, a PMOS transistor, M13 and M14 are each, but not limited to, an NMOS transistor, M0 is, but not limited to, a PMOS transistor, and M20 is, but not limited to, an NMOS transistor.

In the embodiment shown in FIG. 2, during voltage generation, the start control circuit 20 applies the start control current signal, and charges a parasitic capacitance at the gate electrode of M3 through the start control current signal, so as to increase a potential at the gate electrode of M3, thereby to turn on M3, M13 and M14. However, the present disclosure is not limited to thereto.

When the voltage generation module in FIG. 2 is in operation, a current of mirroring M1 flows through M4, and flows through R3, so as to acquire Vreg. A ratio of the current flowing through M4 to the current flowing through M1 is equal to a ratio K1 of a width-to-length ratio of M4 and a width-to-length ratio of M1. The current of M1 flows through R3, so as to acquire Vreg. By selecting a ratio of a resistance value R2z of R2 to a resistance value R1z of R1, Vreg may be independent of temperature, where K1 is a positive number.

The current of mirroring M1 flows through M5, and flows through R4, so as to generate Vldo between two terminals of R4. A ratio of the current flowing through M5 to the current flowing through M1 is equal to a ratio K2 of a width-to-length ratio of M5 and the width-to-length ratio of M1. By selecting the ratio of the resistance value R2z of R2 to the resistance value R1z of R1, Vldo may be independent of temperature, where K2 is a positive number.

A current flowing through R1 is equal to Vbe_Q1/R1, and a current flowing through R2 is equal to ΔVbe/R2, where ΔVbe is equal to Vbe_Q2−Vbe_Q1.

The current flowing through R3 is equal to (Vbe_Q1/R1z+ΔVbe/R2z)×K1, and When M12 is turned off, the current flowing through R4 is equal to (Vbe_Q1/R1z+ΔVbe/R2z)×K2, where Vreg represents the first reference voltage, Vldo represents the second reference voltage, Vbe_Q1 is a voltage between the base of Q1 and the emitter of Q1, Vbe_Q2 is a voltage between the base of Q2 and the emitter of Q2, and ΔVbe is equal to a difference value between Vbe_Q2 and Vbe_Q1.

According to the proportional relationship between the currents, Vreg and Vldo may be acquired, and Vreg and Vldo are independent of temperature.

During voltage generation, under the control of the start control current applied by S1, the related circuits start to operate. When VIN is smaller than Vldo, both M11 and M12 are turned off, the gate electrode of M0 is connected to the ground terminal GND through M13, and M0 is turned on. The output voltage signal from O1 is the input voltage VIN.

M11, M12, M13 and M14 constitute a comparator to compare VIN and Vldo. When VIN increases and a difference value between VIN and Vldo is larger than an absolute value of a threshold voltage of M12, M11 and M12 are turned on, both the gate electrode of M0 and the source electrode of M0 receive VIN, and M0 is turned off. At this time, the output voltage signal at O1 is controlled by M20, and M20 is in a saturation region (a gate-source voltage of M20 is larger than the threshold voltage Vth_m20 of M20), and the voltage value of the output voltage signal is equal to Vreg−Vth_m20. When VIN continues to increase, because M20 is still in the saturation region, the output voltage signal that is independent of VIN is continued to be outputted at O1.

In the embodiment of the present disclosure, since Vbe_Q1 is negatively related to temperature and ΔVbe is negatively related to temperature, by selecting the ratio of the resistance value R2z of R2 to the resistance value R1z of R1, Vreg and Vldo may be independent of temperature.

When the voltage generation module in FIG. 2 is in operation, Vreg depends on a ratio of the resistance value of R3 to the resistance value of R1, a ratio of the resistance value of R3 to the resistance value of R2, and is independent of temperature.

In a possible embodiment of the present disclosure, the voltage generation module further includes a ninth control transistor. A second electrode of the fourth control transistor is electrically connected to the third resistor circuit through the ninth control transistor, a control electrode of the ninth control transistor is electrically connected to the input terminal of the buffer, a first electrode of the ninth control transistor is electrically connected to the second electrode of the fourth control transistor, and a second electrode of the ninth control transistor is electrically connected to the first voltage terminal through the third resistor circuit.

In the embodiment of the present disclosure, the ninth control transistor may be, but not limited to, an N-type transistor.

Figure 3:
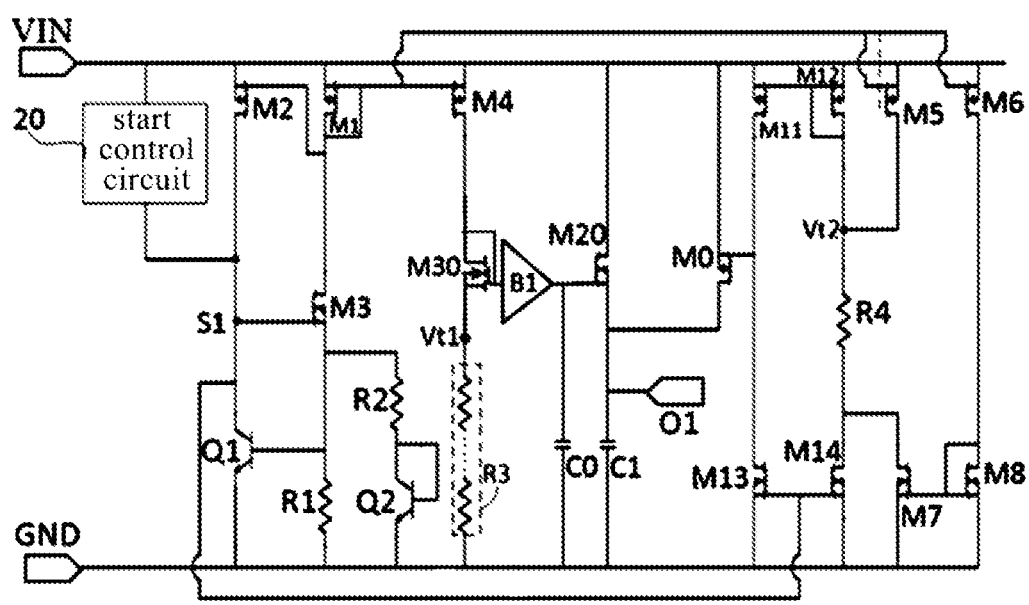
FIG. 3 is another circuit diagram of the voltage generation module according to one embodiment of the present disclosure.

As shown in FIG. 3, on the basis of the voltage generation module in FIG. 2, the voltage generation module further includes a ninth control transistor M30, M4 is electrically connected to R3 through M30, a gate electrode of M30 is electrically connected to the input terminal of the buffer B1, the gate electrode of M30 is electrically connected to a drain electrode of M30, a drain electrode of M30 is electrically connected to the drain electrode of M4, and a source electrode of M30 is electrically connected to the ground terminal GND through the third resistor circuit R3.

In the embodiment shown in FIG. 3, M30 is, but not limited to, an NMOS transistor.

When the voltage generation module in FIG. 3 is in operation, the following processes are differences as compared with the operation process of the voltage generation module in FIG. 2.

When VIN increases and the difference value between VIN and Vldo is larger than the absolute value of the threshold voltage of M12, M11 and M12 are turned on, both the gate electrode of M0 and the source electrode of M0 receive VIN, and M0 is turned off. At this time, the output voltage signal at O1 is controlled by M20, M20 is in the saturation region (the gate-source voltage of M20 is larger than the threshold voltage Vth_m20 of M20), M30 is also in a saturation region, and the voltage value of the output voltage signal is equal to Vreg+Vth_m30−Vth_m20. When VIN continues to increase, because M20 is still in the saturation region, the output voltage signal that is independent of VIN is continued to be outputted at O1.

Because M30 and M20 are transistors of a same type, it is able to enable Vth_m30 to be approximately equal to Vth_m20, so that when VIN is large, the voltage value of the output voltage signal is equal to Vreg.

A power supply management chip according to the embodiment of the present invention includes the above-mentioned voltage generation module.

A display device may be any product or member having a display function, e.g., a mobile phone, a flat-panel computer, a television, a display, a laptop computer, a digital photo frame or a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A voltage generation module, comprising a reference voltage generation circuit, a comparison circuit, a switch circuit and a voltage control circuit, wherein, the reference voltage generation circuit is electrically connected to an input terminal, a first reference voltage terminal and a second reference voltage terminal, and is configured to generate a first reference voltage and a second reference voltage in accordance with an input voltage from the input terminal, output the first reference voltage through the first reference voltage terminal, and output the second reference voltage through the second reference voltage terminal;

the comparison circuit is electrically connected to the input terminal and the second reference voltage terminal, and configured to compare the second reference voltage with the input voltage, apply a turn-on control signal to a control terminal of the switch circuit in a case that the input voltage is smaller than the second reference voltage, and apply a turn-off control signal to the control terminal of the switch circuit in a case that the input voltage is larger than the second reference voltage;

the control terminal of the switch circuit is electrically connected to the comparison circuit, a first terminal of the switch circuit is electrically connected to the input terminal, a second terminal of the switch circuit is electrically connected to a voltage output terminal, and the switch circuit is configured to, in a case that the turn-on control signal is applied to the control terminal of the switch circuit, control the input terminal to be electrically connected to the voltage output terminal, and in a case that the turn-off control signal is applied to the control terminal of the switch circuit, control the input terminal to be electrically disconnected from the voltage output terminal; and the voltage control circuit is electrically connected to the first reference voltage terminal and the voltage output terminal, and is configured to, in a case that the switch circuit controls the input terminal to be electrically disconnected from the voltage output terminal, control an output voltage signal from the voltage output terminal in accordance with the first reference voltage.

2. The voltage generation module according to claim 1, wherein the reference voltage generation circuit comprises a first generation branch circuit, a second generation branch circuit and a third generation branch circuit, the first generation branch circuit comprising a first control terminal, the second generation branch circuit comprising a second control terminal, and the third generation branch circuit comprising a third control terminal, the first control terminal, the second control terminal and the third control terminal electrically connected to each other; and wherein, a first current through the first generation branch circuit, a second current through the second generation branch circuit and a third current through the third generation branch circuit are equal to each other;

the first generation branch circuit is electrically connected to the input terminal, and is configured to generate the first current in accordance with the input voltage;

the second generation branch circuit is electrically connected to the first reference voltage terminal, and is configured to generate the second current in accordance with the first reference voltage; and the third generation branch circuit is electrically connected to the second reference voltage terminal, and is configured to generate the third current in accordance with the second reference voltage.

3. The voltage generation module according to claim 2, wherein:

the first generation branch circuit comprises a first generation transistor, a second generation transistor, a first resistor, a second resistor, a first control transistor, a second control transistor and a third control transistor;

a first electrode of the first control transistor is electrically connected to the input terminal, and both a control electrode of the first control transistor and a second electrode of the first control transistor are electrically connected to the first control terminal;

a control electrode of the second control transistor is electrically connected to the first control terminal, a first electrode of the second control transistor is electrically connected to the input terminal, and a second electrode of the second control transistor is electrically connected to a first electrode of the first generation transistor;

a control electrode of the third control transistor is electrically connected to a start control terminal and the first electrode of the first generation transistor, a first electrode of the third control transistor is electrically connected to the first control terminal, and a second electrode of the third control transistor is electrically connected to a control electrode of the first generation transistor and a first terminal of the first resistor;

a second electrode of the first generation transistor is electrically connected to a second terminal of the first resistor and a first voltage terminal;

a first terminal of the second resistor is electrically connected to the second electrode of the third control transistor, and a second terminal of the second resistor is electrically connected to a first electrode of the second generation transistor;

a control electrode of the second generation transistor is electrically connected to the first electrode of the second generation transistor, and a second electrode of the second generation transistor is electrically connected to the second terminal of the first resistor; and the first current is a sum of a current through the first resistor and a current through the second resistor.

4. The voltage generation module according to claim 3, wherein each of the first generation transistor and the second generation transistor is an NPN-type triode, and each of the first control transistor and the second control transistor is a P-type transistor, and the third control transistor is an N-type transistor.

5. The voltage generation module according to claim 2, wherein the second generation branch circuit comprises a fourth control transistor and a third resistor circuit, a control electrode of the fourth control transistor is electrically connected to the second control terminal, a first electrode of the fourth control transistor is electrically connected to the input terminal, a second electrode of the fourth control transistor is electrically connected to a first voltage terminal through the third resistor circuit, and the second current is a current flowing through the third resistor circuit.

6. The voltage generation module according to claim 5, wherein the third resistor circuit comprises at least two third resistors connected in series to each other, and the fourth control transistor is a P-type transistor.

7. The voltage generation module according to claim 2, wherein:

the third generation branch circuit comprises a fifth control transistor, a sixth control transistor, a seventh control transistor, an eighth control transistor and a fourth resistor;

a control electrode of the fifth control transistor is electrically connected to the third control terminal, a first electrode of the fifth control transistor is electrically connected to the input terminal, and a second electrode of the fifth control transistor is electrically connected to a first terminal of the fourth resistor;

a control electrode of the sixth control transistor is electrically connected to the third control terminal, a first electrode of the sixth control transistor is electrically connected to the input terminal, and a second electrode of the sixth control transistor is electrically connected to a first electrode of the eighth control transistor;

a control electrode of the seventh control transistor is electrically connected to a control electrode of the eighth control transistor, a first electrode of the seventh control transistor is electrically connected to a second terminal of the fourth resistor, and a second electrode of the seventh control transistor is electrically connected to a second electrode of the eighth control transistor; and the control electrode of the eighth control transistor is electrically connected to the first electrode of the eighth control transistor, and the second electrode of the eighth control transistor is electrically connected to a first voltage terminal; and the first terminal of the fourth resistor is electrically connected to the second reference voltage terminal.

8. The voltage generation module according to claim 7, wherein each of the fifth control transistor, the sixth control transistor, the seventh control transistor and the eighth control transistor is a P-type transistor.

9. The voltage generation module according to claim 7, wherein:

the comparison circuit comprises a first comparison transistor, a second comparison transistor, a third comparison transistor and a fourth comparison transistor; a control electrode of the first comparison transistor is electrically connected to a control electrode of the second comparison transistor, a first electrode of the first comparison transistor is electrically connected to the input terminal, and a second electrode of the first comparison transistor is electrically connected to the control terminal of the switch circuit;

the control electrode of the second comparison transistor is electrically connected to a second electrode of the second comparison transistor, a first electrode of the second comparison transistor is electrically connected to the input terminal, and the second electrode of the second comparison transistor is electrically connected to the first terminal of the fourth resistor;

a control electrode of the third comparison transistor is electrically connected to a start control terminal, a first electrode of the third comparison transistor is electrically connected to the control terminal of the switch circuit, and a second electrode of the third comparison transistor is electrically connected to the first voltage terminal; and a control electrode of the fourth comparison transistor is electrically connected to the control electrode of the third comparison transistor, a first electrode of the fourth comparison transistor is electrically connected to the second terminal of the fourth resistor, and a second electrode of the fourth comparison transistor is electrically connected to the first voltage terminal.

10. The voltage generation module according to claim 9, wherein each of the first comparison transistor and the second comparison transistor is a P-type transistor, and each of the third comparison transistor and the fourth comparison transistor is an N-type transistor.

11. The voltage generation module according to claim 1, wherein the switch circuit comprises a switch transistor, a control electrode of the switch transistor is the control terminal of the switch circuit, a first electrode of the switch transistor is the first terminal of the switch circuit, and a second electrode of the switch transistor is the second terminal of the switch circuit.

12. The voltage generation module according to claim 11, wherein the switch transistor is a P-type transistor.

13. The voltage generation module according to claim 1, wherein:
the voltage control circuit comprises a buffer, a voltage control transistor and a control capacitor;
an input terminal of the buffer is electrically connected to the first reference voltage terminal, an output terminal of the buffer is electrically connected to a control electrode of the voltage control transistor, and the buffer is configured to apply the first reference voltage to the control electrode of the voltage control transistor;
a first electrode of the voltage control transistor is electrically connected to the input terminal, and a second electrode of the voltage control transistor is electrically connected to the voltage output terminal; and
a first terminal of the control capacitor is electrically connected to the output terminal of the buffer, and a second terminal of the control capacitor is electrically connected to a first voltage terminal.

14. The voltage generation module according to claim 13, wherein the voltage control transistor is an N-type transistor.

15. The voltage generation module according to claim 13, further comprising a ninth control transistor; wherein:
the reference voltage generation circuit comprises a second generation branch circuit, and the second generation branch circuit comprises a fourth control transistor and a third resistor circuit;
a second electrode of the fourth control transistor is electrically connected to the third resistor circuit through the ninth control transistor; and
a control electrode of the ninth control transistor is electrically connected to the input terminal of the buffer, a first electrode of the ninth control transistor is electrically connected to the second electrode of the fourth control transistor, and a second electrode of the ninth control transistor is electrically connected to the first voltage terminal through the third resistor circuit.

16. The voltage generation module according to claim 15, wherein the ninth control transistor is an N-type transistor.

17. A power supply management chip, comprising the voltage generation module according to claim 1.

* * * * *